(12) United States Patent
Erickson et al.

(10) Patent No.: US 8,322,361 B2
(45) Date of Patent: *Dec. 4, 2012

(54) METHODS, APPARATUS AND/OR SYSTEMS RELATING TO CONTROLLING FLOW THROUGH CONCENTRIC PASSAGES

(75) Inventors: Dean M. Erickson, Simpsonville, SC (US); Douglas S. Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 1009 days.

This patent is subject to a terminal disclaimer.

(21) Appl. No.: 12/345,734

(22) Filed: Dec. 30, 2008

(65) Prior Publication Data

US 2010/0163120 A1    Jul. 1, 2010

(51) Int. Cl.
 G05D 11/00 (2006.01)
 B01F 5/04 (2006.01)
 E03B 1/00 (2006.01)
 F16K 11/02 (2006.01)
(52) U.S. Cl. .................... 137/111; 137/896; 137/605
(58) Field of Classification Search .............. 239/407, 239/410; 137/111, 896, 605, 897, 606, 337, 137/339, 340; 165/155
See application file for complete search history.

(56) References Cited

U.S. PATENT DOCUMENTS

| 2,797,132 | A | * | 6/1957 | Alpert | 137/584 |
| 3,067,785 | A | * | 12/1962 | Meyer | 141/57 |
| 4,361,187 | A | * | 11/1982 | Luers | 166/326 |
| 6,572,032 | B2 | * | 6/2003 | Chih | 239/375 |

* cited by examiner

*Primary Examiner* — Dinh Q Nguyen
*Assistant Examiner* — Chee-Chong Lee
(74) *Attorney, Agent, or Firm* — Mark E. Henderson; Ernest G. Cusick; Frank A. Landgraff

(57) ABSTRACT

An annular dual-flow check valve for controlling the flow through concentric channels that have a common outlet, comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein: the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet.

20 Claims, 2 Drawing Sheets

METHODS, APPARATUS AND/OR SYSTEMS RELATING TO CONTROLLING FLOW THROUGH CONCENTRIC PASSAGES

BACKGROUND OF THE INVENTION

This present application relates generally to apparatus, methods and/or systems pertaining to controlling flow through concentric hollow passages. More specifically, but not by way of limitation, the present application relates to apparatus, methods and/or systems pertaining to an annular style check valve that passively controls two independent supply flow streams to a common outlet flow stream.

In certain industrial applications, there is a need for controlling the flow of supply lines that are configured in a concentric arrangement and that have a common outlet. While certain conventional systems may be configured to functional perform this tasks, they are bulky, inefficient, expensive and/or require active control. As a result, there remains a need for improved apparatus, methods and/or systems relating to the more efficient and cost effective control of the flows through concentrically arranged supply lines.

BRIEF DESCRIPTION OF THE INVENTION

The present application thus describes an annular dual-flow check valve for controlling the flow through concentric channels that have a common outlet, comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein: the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet.

The present application further describes an annular dual-flow check valve for controlling the flow through concentric channels that have a common outlet, comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein: the axial movement of the annular poppet is regulated by the extent to which the pressure of the flow upstream of the annular poppet in the outer channel depresses the spring by pushing on the annular poppet; the axial range of motion of the annular poppet includes at least two axial positions: a closed position where the annular poppet substantially covers the opening and a open position where at least a portion of the opening is not covered by the annular poppet; and the spring and annular poppet are configured such that: when the level of pressure of the flow upstream of the annular poppet is below a first pre-determine pressure level, the annular poppet resides in the closed position; and when the level of pressure of the flow upstream of the annular poppet is above a second predetermine pressure level, the annular poppet resides in the open position.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
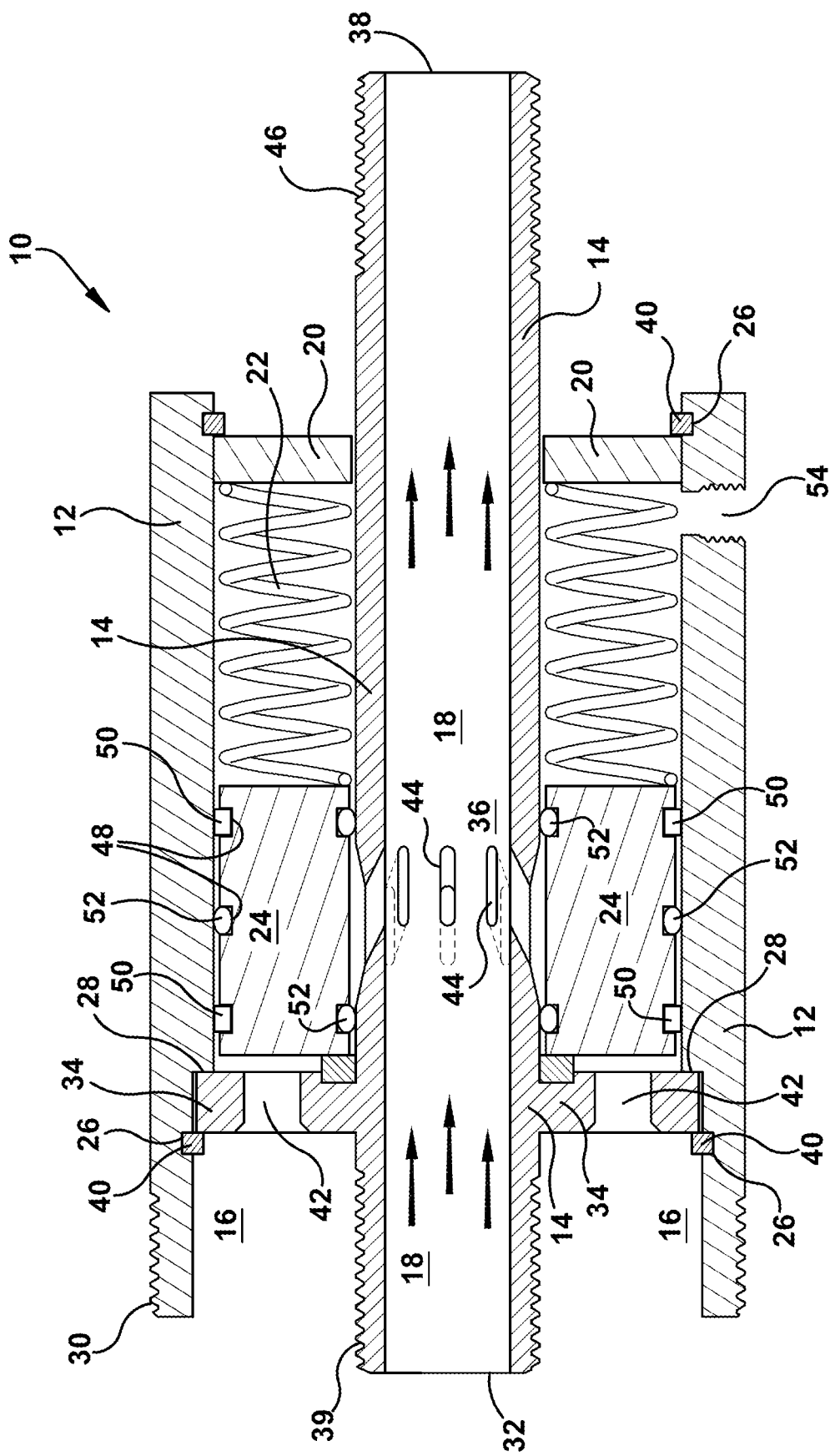
FIG. 1 is a cross-section of a annular dual-flow check valve in accordance with an exemplary embodiment of the present application.

Referring now to the figures, FIG. 1 illustrates a section view of an annular dual-flow check valve 10 according to an exemplary embodiment of the present invention. As illustrated, the annular dual-flow check valve 10 may include an outer body 12 and an inner body 14 that define concentric flow channels, an outer channel 16 and an inner channel 18. The annular dual-flow check valve 10 further may include an assembly end-cap or end-cap 20, a spring 22, and an annular check poppet or annular poppet 24, which will be discussed in more detail below.

The outer body 12 generally forms a hollow chamber that is substantially cylindrical in shape and which forms the outer boundary of the outer channel 16. The inner wall of the outer body 12 may have grooves 26 or steps 28 formed therein, which, as discussed in more detail below, may be used to secure or fix the axial position of other components within the outer body 12, though, as one of ordinary skill in the art will appreciate, other conventional methods or mechanical connections may also be used. The upstream end of the outer body 12 may be formed with a connecting means, such as, for example, a threaded outer surface 30, which may be used to connect the outer body 12 to another pipe. Other means of attachment also may be used. Note that, given the depiction of the annular dual-flow check valve 10 in FIG. 1, the flow through it, in operation, will move in a general left to right direction. The relative positioning of components may be described with an "upstream" or "downstream" designation. Accordingly, components on the left side may be referred to as being on the "upstream" side while components on the right side may be referred to as being on the "downstream" side. It will be appreciated that this description relates to the direction of flow through the annular dual-flow check valve 10. In addition, the annular dual-flow check valve 10 may be used to channel flows of gases or liquids, or a combination of a flow of liquids and a flow of gas.

The inner body 14 generally forms a hollow chamber that is cylindrical in shape. The outer surface of the inner body 14 generally forms the inner boundary of the outer channel 16 and the inner surface of the inner body 14 generally forms the outer boundary of the inner channel 18. The inner body 14 is sized and configured such that it may be inserted within the outer body 12. (Note that the preferred embodiment of FIG. 1 is described as comprising an assembly of separate parts. This is exemplary only. As one of ordinary skill in the art will appreciate, the outer body 12 could be constructed such that it is integral to the inner body 14 and/or to some of the other parts described.) Generally, moving from the upstream end to the downstream end, the inner body 14 may include an inlet 32, a flange 34, a mid-body 36, and an outlet 38, all of which have the inner channel 18 defined therethrough. (Note that the description of these several parts of the inner body 14 is done for the convenience of clear description and not intended to be limiting in any way.) The inlet 32 generally forms the inlet to the inner channel 18 that extends through the inner body 14, and comprises a relatively thin sleeve or wall that defines a hollow cylindrical passageway. The inlet 32 may extend upstream a desired distance and, as shown, may terminate with a connecting means, such as, for example, an outer threaded surface 39, which may be used to connect to another pipe or hollow passageway.

The flange 34 extends radially outward from the inner body 14 and makes a connection with the outer body 14 that substantially secures or fixes the axial position of the inner body 14 within the outer body 12. For example, as shown, the flange 34 may have a diameter that is greater than the diameter at a narrow point or circumferential step 28 formed in the inner wall of the outer body 12. Thereby, the step 28 may restrict the axial movement of the flange 34 (and thus the inner body 14) in one axial direction (as shown, the step restricts the movement of the flange 34 in the downstream direction). A groove 26 may be positioned just upstream of the upstream end of the flange 34, and an insert 40 then may be used to engage the groove 26 and narrow the diameter of the outer channel 16, similar in function to the step 28. Thereby, as illustrated, the groove 26/insert 40 assembly may restrict movement of the flange 34 (and thus the inner body 14) in the upstream direction. That is, the insert 40 may extend radially inward such that it prevents the flange 34 from moving upstream. As one of ordinary skill in the art will appreciate, other mechanical connections or configurations may be used to restrict the axial movement of the flange 34/inner body 14. Within the flange 34, several flange channels 42 may be formed. The flange channels 42 may provide an axially oriented channel or opening through the flange 34 such that the flow through the outer channel 16 may pass through the flange 34, i.e., the flange 34 does not block the flow through the outer channel 16. The flange channels 42 may be sized and configured depending on desired performance.

The mid-body 36 of the inner body 14 generally may extend axially from the flange 34 in a downstream direction. The mid-body 36 may include a relatively thin sleeve or wall that defines a hollow cylindrical passageway. Within the mid-body 36, multiple passageways or apertures may be formed through the sleeve or wall that defines the inner channel 18. As shown in FIG. 1, these passageways or apertures may comprise slots 44 in certain preferred embodiments. In general, the slots 44 form openings between the outer channel 16 and the inner channel 18 such that the outer channel 16 is in fluid communication with the inner channel 18. As illustrated in the embodiment of FIG. 1, the slots 44 may be axially oriented elongated openings. As stated, openings of other shapes also may be used, such as, for example, multiple circular apertures or holes. As explained in more detail below, the axial location of the slots 44 generally will coincide with the axial location of the annular poppet 24 and its range of motion.

The outlet 38 generally forms the outlet of the inner channel 18 that extends through the inner body 14. The outlet 38 generally extends downstream a desired distance from the mid-body 36 and, as shown, may terminate after a relatively short distance with a connecting means, such as, for example, a threaded outer surface 46. The threaded outer surface 46 of the outlet 38 may be used to connect the inner body 14 to a pipe or other fitting so that the inner channel 18 continues downstream.

The end-cap 20 may be formed at the downstream end of the outer body 12. The end-cap 20 generally provides a stationary or fixed surface against which on end of the spring 22 may rest and, to fulfill this function, may be of several different designs, sizes and configurations. As shown, the end-cap 20 is circular in shape with a middle hole or passage through which the inner body may pass. The end-cap 20 may be held in place by a groove 26/insert 40 assembly, though other mechanical connections may be used to secure the axial position of the end-cap 20.

As described, one end of the spring 22 may rest against the end-cap 20. The other end of the spring 2 may rest against the annular poppet 24. The spring 22 may be a conventional spring or equivalent mechanical device that generally circumscribes the inner body 14. As shown, the annular poppet 24 is a dough-nut shaped piece that is generally free to move axially against the spring 22 as the pressure of the flow through the outer channel 16 dictates. Further, the annular poppet 24 generally provides a solid piece that extends between the inner surface of the outer body 12 and the outer surface of the inner body 14. The inner body 14 and the inner channel 18 may extend through the hollow opening in the center of the annular poppet 24. The annular poppet 24 also may have several poppet grooves 48 cut into its inner and outer surfaces where guides 50 and/or o-rings 52 may be located. The guides 50 may be comprised of teflon or other suitable material and, as one of ordinary skill in the art will appreciate, may operate to assist the movement of the annular poppet 24. The o-rings 52 be made of any suitable material, and, as one of ordinary skill in the art will appreciate, may function to seal the annular poppet 24 such that axial flow around the poppet 24 is substantially prevented.

The end-cap 20, the spring 22, and the annular poppet 24 may be configured within the outer body 12 and around the inner body 14 such that: 1) when the spring 22 is not compressed, the poppet 24 resides in an axial position that covers the slots 44 (thus preventing flow from the outer channel 16 to the inner channel 14 through the slots 44); and 2) when the spring is compressed, the poppet 24 resides downstream of the slots 44 such that one or more of the slots 44 are uncovered (thus allowing flow from the outer channel 16 to the inner channel 14 through the slots 44). A drain 54 may be located upstream of the end-cap 20. The drain 54 may comprise an aperture or hole through the outer body 12 that provides an outlet for any fluids or gases that enter the outer channel 16 downstream of the poppet 24.

The annular dual-flow check valve 10 assembly that is described above is configured such that it may be constructed and assembled in a cost-effective and efficient matter. For example, the end-cap 20 may be inserted into the outer body 12 through the upstream end and slid downstream until its axial movement is checked by a groove 26/insert 40 assembly that is positioned near the downstream end of the outer body 14. The spring 22 may then be inserted into the outer body 16 until it rests against the end-cap 20. Then, the annular poppet 24 may be inserted into the outer body 16 until it rests against the spring 22. The inner body 14 then may be inserted until the flange 34 rests against the step 28. The flange 34 then may be bracketed between the step 28 and another groove 26/insert 40 assembly positioned upstream of it, thereby securing the axial position of the inner body 14 within the outer body 12. This generally completes the assembly of the annular dual-flow check valve 10 in accordance with an exemplary embodiment of the present invention. As one of ordinary skill there will appreciate, the specifics of the several mechanical connections may be varied without departing from the general design that allows such a convenient assembly.

In use, the annular dual-flow check valve 10 may operate as follows. As illustrated in FIG. 1, the pressure of the flow into the outer channel 18 may be insufficient to move the annular poppet 24 against the spring 22, i.e., the flow may be insufficient to depress the spring 22. In this case, the annular poppet 24 resides in a "closed position." In the closed position, the annular poppet 24 may reside in substantially the same axial position as the slots 44, thereby covering the slots 44. Flow through the inner channel 18 may take place, but flow from the outer channel 16 to the inner channel 18 and from the inner channel 18 to the outer channel 16 is substantially blocked by the annular poppet 24. As one of ordinary skill in the art will appreciate, such flow may be more completely blocked by the poppet 24 with the usage of the o-rings 52 that are positioned on either side of the slots 44, i.e., the upstream side and the downstream side of the slot 44. It will be appreciated that some flow may occur from the inner channel 18 through the slots 44 and provide pressure against the poppet 24. However, the pressure of the flow through the slot 44 and against the poppet 24 is not oriented in a direction that engages or moves the poppet 24 against the spring 22. Thus, the poppet 24 remains in a position to cover the slots 44 and prevents or substantially prevents flow from the inner channel 18 to the outer channel 16. Again, the usage of the o-rings 52 may more completely block any such flow.

Figure 2:
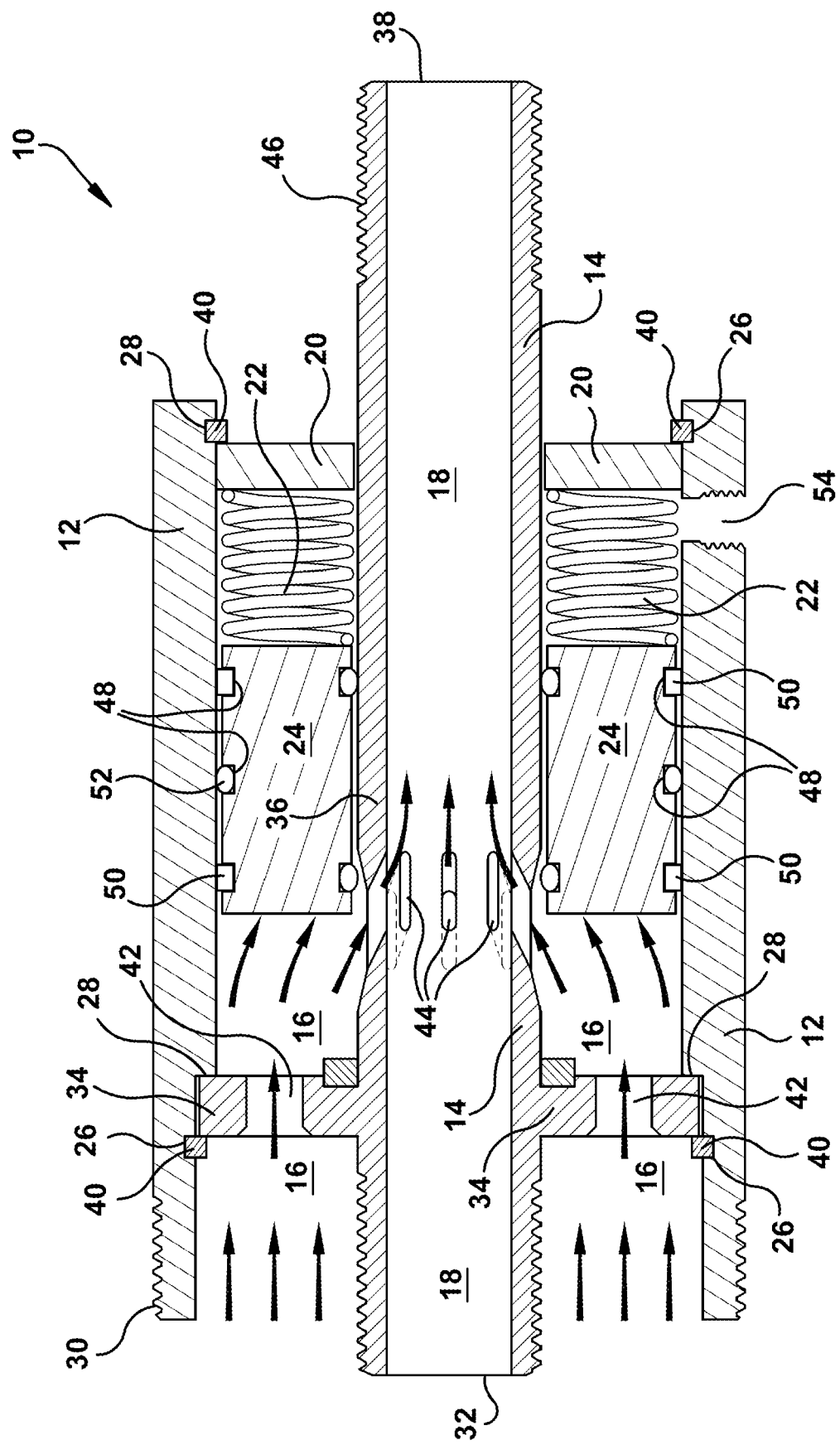
FIG. 2 is another cross-sectional view of the annular dual-flow check valve of FIG. 1.

Alternatively, as illustrated in FIG. 2, a pressurized flow into the outer channel 16 may apply sufficient pressure against the annular poppet 24 such that the poppet 24 depresses the spring 22 and, thereby, moves axially in a downstream direction. When the annular poppet 24 has moved in the downstream direction such that the slots 44 are at least partially uncovered, the poppet 24 may be described as residing in an "open position." In the open position, the gas or liquid from the outer channel 16 may flow into the inner channel 18 via the slots 44. An upstream valve (not shown) in the inner channel 18 may stop the flow to the inlet 32 of the inner body 14. In this case, the flow from the outer channel 16 through the slots 44 becomes substantially the entire flow through the inner body 14. If the flow to the inlet 32 of the inner body 14 is maintained while the poppet 24 resides in the open position, the flow through the inner channel 18 and the outer channel 16 may be mixed. In certain cases, this type of operation may be advantageous.

As stated, the slots 44 may be configured differently for optimum operation. As illustrated, the slots 44 generally comprise axially oriented elongated openings. In a preferred embodiment, the slots 44 may be angled in a downstream direction from their opening in the outer surface of the inner body 14. In a preferred embodiment, the axis of the slot 44 and the axis of the inner channel 18 may form an angle of between 30° and 60°. Among other advantages, this configuration may allow for enhanced and more efficient flow from the outer channel 16 to the inner channel 18. Upstream of the slot 44, as illustrated, the diameter of the outer surface of the inner body 14 may gradually narrow until the upstream end of the slots 44 is reached. Thus, the slots 44 may reside in a section that has a reduced diameter as the general diameter of the inner body 14. This gradual narrowing that occurs upstream of the slots 44 may provide for more efficient flow into the slots 44 from the outer channel 16. In addition, the gradual narrowing may allow the o-rings 52 to be incrementally or gradually loaded when the poppet 24 moves to the open position, which generally will prevent the o-rings 52 from being displaced by an immediate loading of the pressurized flow from the outer channel 16 that would occur otherwise. Downstream of the slots 44, as illustrated, the diameter of the outer surface of the inner body 14 may gradually broaden until the general diameter of the inner body 14 is obtained.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. An annular dual-flow check valve for controlling the flow through concentric channels that have a common outlet, comprising:
    an outer body and an inner body that define the concentric channels, which include an outer channel and an inner channel formed therein;
    a spring activated annular poppet that resides in the outer channel and has a range of motion in the axial direction; and
    an opening through the inner body that connects the outer channel to the inner channel;
    wherein:
        the axial movement of the annular poppet is regulated by the pressure of the flow upstream of the annular poppet in the outer channel; and
        the axial range of motion of the annular poppet includes at least two axial positions: a closed position where the annular poppet substantially covers the opening and a open position where at least a portion of the opening is not covered by the annular poppet.

2. The annular dual-flow check valve according to claim 1, wherein the axial movement of the annular poppet is regulated by the extent to which the pressure of the flow upstream of the annular poppet in the outer channel depresses the spring by pushing on the annular poppet.

3. The annular dual-flow check valve according to claim 2, wherein the spring and annular poppet are configured such that:
    when the level of pressure of the flow upstream of the annular poppet is below a first predetermine pressure level, the annular poppet resides in the closed position; and
    when the level of pressure of the flow upstream of the annular poppet is above a second predetermine pressure level, the annular poppet resides in the open position.

4. The annular dual-flow check valve according to claim 1, wherein:
    the outer body forms a hollow chamber that is substantially cylindrical in shape, the inner wall of which forms the outer boundary of the outer channel;
    an upstream end of the outer body comprises connecting means; and
    the inner body forms a hollow chamber that is substantially cylindrical in shape, the outer wall of which forms the inner boundary of the outer channel and the inner wall of which forms the outer boundary of the inner channel.

5. The annular dual-flow check valve according to claim 1, wherein the inner body comprises:
    an inlet to the inner channel, the inlet extending in the upstream direction a desired distance and terminating with a means for terminating;

a flange that extends radially from the inner body to the inner wall of the outer body and includes one or more flange channels therethrough;

a mid-body that includes the opening; and an outlet to the inner channel, the outlet extending in the downstream direction a desired distance and terminating with a means for connecting.

6. The annular dual-flow check valve according to claim 5, wherein:

the flange comprises a radially extension that engages the outer body such that the axial position of the inner body in relation to the outer body is fixed; and the one or more flange channels comprise passageways through the flange that allow flow through the outer channel to pass through the flange.

7. The annular dual-flow check valve according to claim 6, wherein the inner wall of the outer body includes a circumferential step that comprises a diameter that is less than the diameter of the flange such that the circumferential step prevents the axial movement of the flange in the downstream direction.

8. The annular dual-flow check valve according to claim 1, wherein the opening comprises a plurality of slots, the slots comprising axially oriented elongated openings.

9. The annular dual-flow check valve according to claim 8, wherein the slots extend through the inner body angled in the downstream direction such that the axis through each of the slots forms an angle of between 30° and 60° with the axis through the inner channel.

10. The annular dual-flow check valve according to claim 8, wherein:

the diameter of the outer surface of the inner body gradually narrows upstream of the slots;

the slots reside in a section of the inner body that comprises a reduced diameter; and the diameter of the outer surface of the inner body gradually broadens downstream of the slots.

11. The annular dual-flow check valve according to claim 1, wherein the opening comprises a plurality of circular shaped apertures.

12. The annular dual-flow check valve according to claim 1, wherein:

the annular poppet comprises solid doughnut shaped piece that extends substantially between the inner surface of the outer body and the outer surface of the inner body; and annular poppet comprises one or more poppet grooves that are configured to engage one or more o-rings that, upon assembly, substantially seal the annular poppet against the neighboring surfaces of the outer body and the inner body.

13. The annular dual-flow check valve according to claim 1, further comprising an end-cap, the end-cap comprising a radially oriented surface that is fixed within the outer body that upon which the spring may rest when assembled;

wherein:

the end-cap, the spring, and the annular poppet are configured within the outer body and around the inner body such that: a) when the spring is not compressed beyond a predetermined amount, the annular poppet resides in an axial position that covers the opening, thereby preventing flow from the outer channel to the inner channel through the opening and flow from the inner channel to the outer channel through the opening; and b) when the spring is compressed beyond the predetermined amount, the annular poppet resides in a position that is downstream of the opening such that at least some of the opening is not covered by the annular poppet, thereby allowing flow from the outer channel to the inner channel through the opening.

14. The annular dual-flow check valve according to claim 1, further comprising a drain that resides upstream of the end-cap, the drain comprising an aperture through the outer body that is configured to provide an outlet for fluids that may leak around the annular poppet during operation.

15. The annular dual-flow check valve according to claim 1, further comprising:

a first valve that is located upstream of the annular dual-flow check valve and controls the flow entering the outer channel; and a second valve that is located upstream of the annular dual-flow check valve and controls the flow entering the inner channel.

16. The annular dual-flow check valve according to claim 15, further comprising a check valve that is positioned between the second valve and the opening.

17. An annular dual-flow check valve for controlling the flow through concentric channels that have a common outlet, comprising:

an outer body and an inner body that define the concentric channels, which include an outer channel and an inner channel formed therein;

a spring activated annular poppet that resides in the outer channel and has a range of motion in the axial direction; and an opening through the inner body that connects the outer channel to the inner channel;

wherein:

the axial movement of the annular poppet is regulated by the extent to which the pressure of the flow upstream of the annular poppet in the outer channel depresses the spring by pushing on the annular poppet;

the axial range of motion of the annular poppet includes at least two axial positions: a closed position where the annular poppet substantially covers the opening and a open position where at least a portion of the opening is not covered by the annular poppet; and the spring and annular poppet are configured such that: when the level of pressure of the flow upstream of the annular poppet is below a first predetermine pressure level, the annular poppet resides in the closed position; and when the level of pressure of the flow upstream of the annular poppet is above a second predetermine pressure level, the annular poppet resides in the open position.

18. The annular dual-flow check valve according to claim 17, wherein the inner body comprises:

an inlet to the inner channel, the inlet extending in the upstream direction a desired distance and terminating with a means for terminating;

a flange that extends radially from the inner body to the inner wall of the outer body and includes one or more flange channels therethrough;

a mid-body that includes the opening; and an outlet to the inner channel, the outlet extending in the downstream direction a desired distance and terminating with a means for connecting;

wherein:

the flange comprises a radially extension that engages the outer body such that the axial position of the inner body in relation to the outer body is fixed; and the one or more flange channels comprise passageways through the flange that allow flow through the outer channel to pass through the flange.

19. The annular dual-flow check valve according to claim 17, wherein:
- the opening comprises a plurality of slots, the slots comprising axially oriented elongated openings;
- the slots extend through the inner body angled in the downstream direction such that the axis through each of the slots forms an angle of between 30° and 60° with the axis through the inner channel;
- the diameter of the outer surface of the inner body gradually narrows upstream of the slots;
- the slots reside in a section of the inner body that comprises a reduced diameter; and
- the diameter of the outer surface of the inner body gradually broadens downstream of the slots.

20. The annular dual-flow check valve according to claim 17, further comprising an end-cap, the end-cap comprising a radially oriented surface that is fixed within the outer body that upon which the spring may rest when assembled; wherein:

the end-cap, the spring, and the annular poppet are configured within the outer body and around the inner body such that: a) when the spring is not compressed beyond a predetermined amount, the annular poppet resides in an axial position that covers the opening, thereby preventing flow from the outer channel to the inner channel through the opening and flow from the inner channel to the outer channel through the opening; and b) when the spring is compressed beyond the predetermined amount, the annular poppet resides in a position that is downstream of the opening such that at least some of the opening is not covered by the annular poppet, thereby allowing flow from the outer channel to the inner channel through the opening.

* * * * *